Dec. 28, 1943.         F. KRUEGER                 2,337,901
METHOD OF AND APPARATUS FOR MAKING CAN BODIES
Original Filed March 13, 1940    4 Sheets-Sheet 1

INVENTOR
Frank Krueger.
BY
Fay, Macklin, Gobrick and Williams
ATTORNEYS.

Dec. 28, 1943.   F. KRUEGER   2,337,901
METHOD OF AND APPARATUS FOR MAKING CAN BODIES
Original Filed March 13, 1940   4 Sheets-Sheet 2
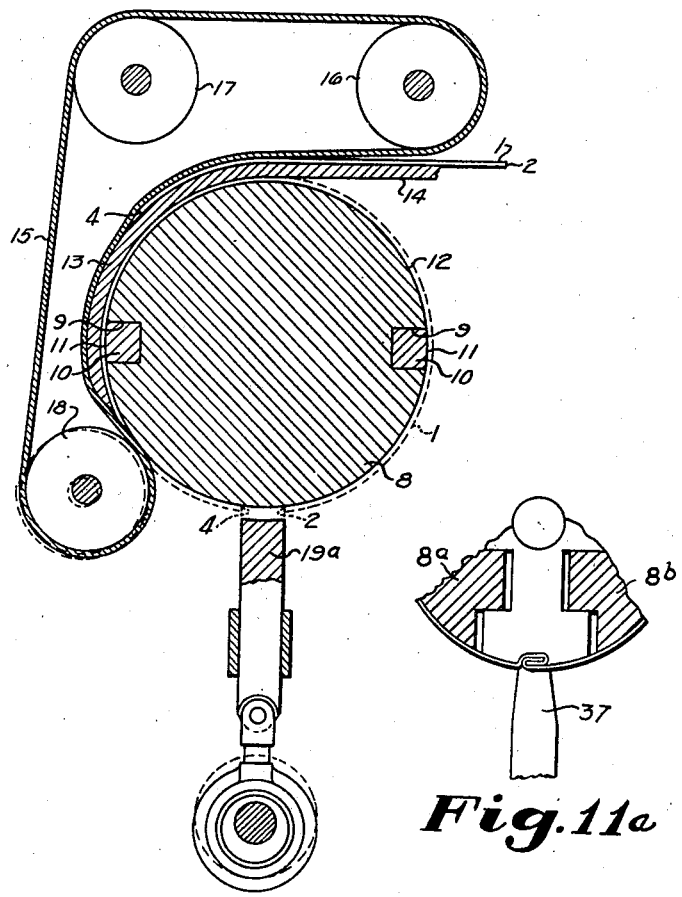
Fig. 2
Fig. 11a
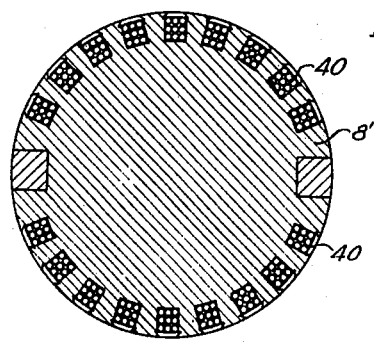
Fig. 12
INVENTOR
Frank Krueger
BY
Fay, Macklin, Golrick and Williams
ATTORNEYS.

Dec. 28, 1943.  F. KRUEGER  2,337,901
METHOD OF AND APPARATUS FOR MAKING CAN BODIES
Original Filed March 13, 1940   4 Sheets-Sheet 3
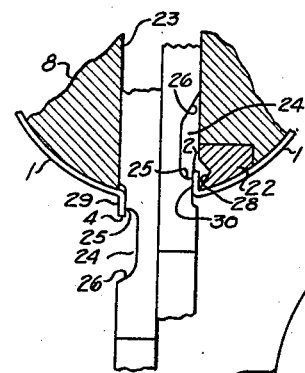
Fig.5
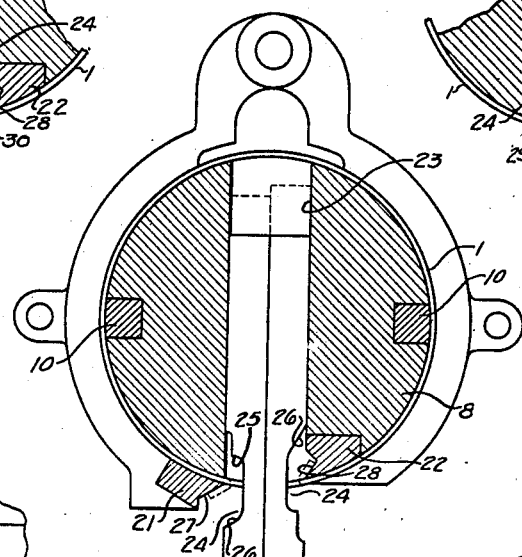
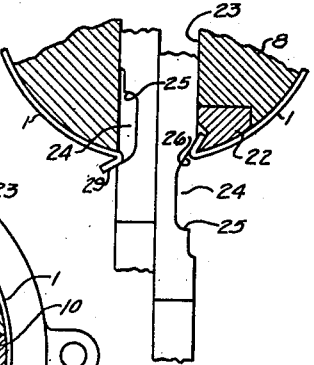
Fig.6
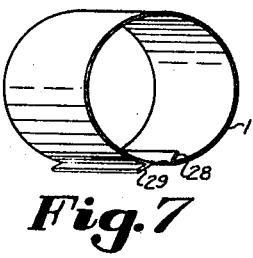
Fig.7
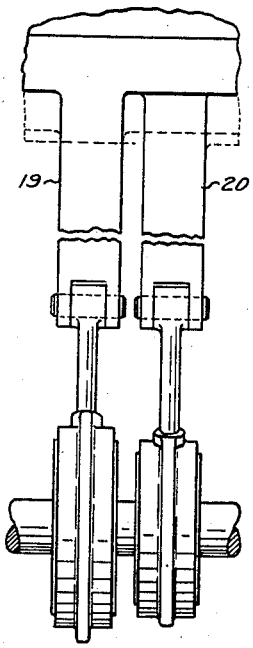
Fig.4
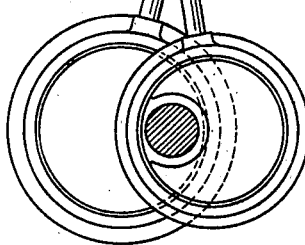
Fig.3
INVENTOR
Frank Krueger.
BY
Fay, Macklin, Golrich and Williams
ATTORNEYS.

Dec. 28, 1943.   F. KRUEGER   2,337,901
METHOD OF AND APPARATUS FOR MAKING CAN BODIES
Original Filed March 13, 1940   4 Sheets-Sheet 4

INVENTOR
Frank Krueger
BY Fay, Macklin, Golrick and Williams
ATTORNEYS.

Patented Dec. 28, 1943

2,337,901

UNITED STATES PATENT OFFICE 2,337,901

METHOD OF AND APPARATUS FOR MAKING CAN BODIES

Frank Krueger, Chicago, Ill., assignor to E. W. Bliss Company, Brooklyn, N. Y., a corporation of Delaware Original application March 13, 1940, Serial No. 323,715. Divided and this application April 22, 1941, Serial No. 389,779

2 Claims. (Cl. 113—7)

This invention relates, as indicated, to a method of and apparatus for making can bodies, but has reference more particularly to a method and apparatus for making bodies which have side seams formed of interlocked flanges.

It has heretofore been proposed, as in Leavitt Patent No. 382,537, to feed can body blanks between a pair of coacting rollers and against a former which bends the blank downwardly and guides it into the space about a horn, the blank being carried forward until its leading edge strikes against a shoulder formed on the horn.

This method was disadvantageous in a number of respects, first of which was the fact that it required the mounting of the horn in a heavy and cumbersome block, making access to the horn extremely difficult. Another disadvantage was that it resulted in the formation of a seam at the top of the formed blank, so that when solder was subsequently applied to the seam, such solder was likely to run over the can body. A third disadvantage was the lack of speed, and production capacity.

Although in later developments in the can body making art, the blank was so formed as to place the seam at the bottom, thereby obviating the aforesaid disadvantage, the auxiliary devices required for forming the blank were still such that the speed of forming was not sufficient to meet present day demands.

A primary object of the present invention, accordingly, is to provide a method of and apparatus for making can bodies, whereby high speeds and maximum production are attained with a minimum amount of equipment.

Another object of the invention is to provide a method of the character described involving an especially advantageous sequence of steps or operations.

Another object of the invention is to provide novel apparatus or means for rolling a can body blank.

Other objects and advantages of the invention will be apparent during the course of the following description.

In the accompanying drawings, forming a part of this specification, and in which like numerals are employed to designate like part throughout the same, Fig. 1 is a plan view of my improved body maker;

Fig. 2 is a section therethrough as indicated by the lines 2—2 of Fig. 1;

Fig. 3 is a section through Fig. 1 as indicated by the lines 3—3 thereon;

Fig. 4 is a side view of a detail of the mechanism shown in Fig. 3;

Figs. 5 and 6 are details of the mechanism in Fig. 3 showing the position of the parts during the edging operation;

Fig. 7 is a perspective of a can body with the seam edge;

Fig. 11 shows the position of the same parts immediately prior to the bumping operation;

Fig. 11a is a fragmentary view, similar to Fig. 11, but showing the completion of the bumping operation; and Fig. 12 is a cross-sectional view of a modified form of magnetic horn.

Figure 1:
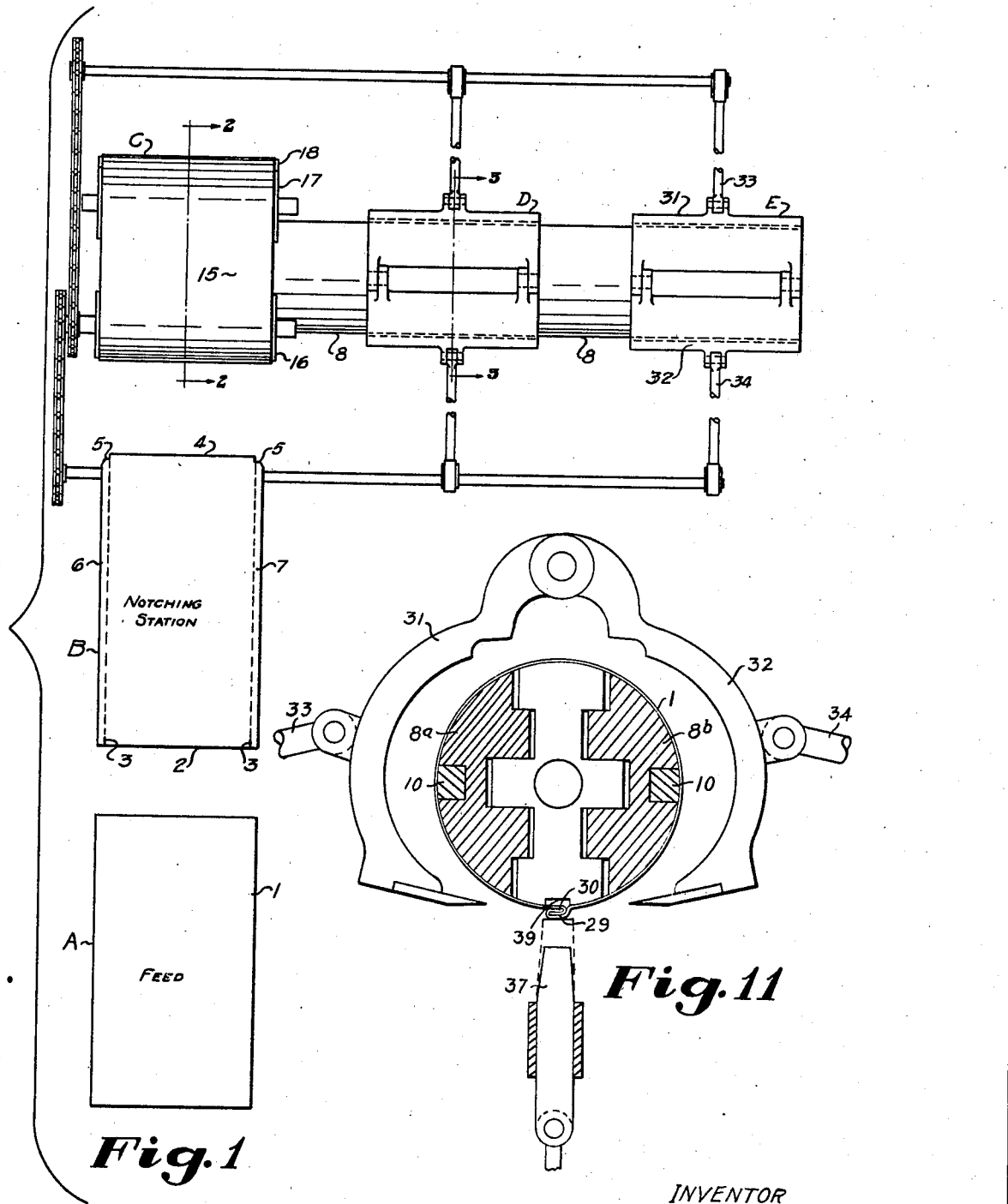

The apparatus, as shown, comprises a feed station A, a notching station B, a rolling station C, and edging station D and a bumping station E.

The can body blank 1 is fed to the notching station B from a pile of such blanks located at the feed station A, as by means of a sheet feeder, not shown, but which may, for example, be a sheet feeding mechanism, such as disclosed in my copending application, Serial No. 264,521, filed March 28, 1939. At the notching station, one of the seam edges 2 of the can is slitted at points spaced somewhat from the ends of such edge, as indicated by reference numeral 3 and corner portions are blanked out at the ends of the other seam edge 4 of the blank, as indicated by reference numeral 5. The resulting blank then includes top and bottom marginal portions 6 and 7, which are utilized in forming the can end flanges to which the ends of the can are adapted to be secured.

The slitted and notched blank 1 then proceeds to the rolling station C, consisting of mechanism which is illustrated more or less diagrammatically in Fig. 2, whereby the can is curved into cylindrical form. This mechanism comprises a magnetic horn 8 having longitudinally extending recesses 9 therein at diametrically opposed points in which feed fingers 10 are mounted for reciprocatory movement. The outer surfaces 11 of these fingers form in effect a continuation of the outer surface 12 of the horn.

In spaced relation to the horn, and curved to conform with the outer surface 12 of the latter, is a stationary bending arbor 13, the upper portion of this arbor being extended to provide a horizontal table portion 14 upon which the blank is adapted to be received.

An endless belt 15 is provided, which extends around sheaves 16, 17 and 18 and whose outer surface is adapted to bear against the arbor 13 for blank-feeding purposes, as will be presently described.

The mechanism further includes a vertically reciprocable blank stop 19a.

As the blank 1 is received on the arbor 13, it is fed forwardly by the belt 15 and, at the same time, curved to conform with the arbor. With the blank stop 19a in lowered position, the blank, moving at a high speed, envelops the horn 8, and its motion ceases when the stop is raised into contact with the horn, as indicated by the dotted lines in Fig. 2, and the edge 4 of the blank engages said stop. The blank is of such size that when the movement of the blank is arrested by the stop, the rear edge 2 of the blank lies adjacent the side of the stop which is opposite that engaged by the edge 4. The blank, which has now been rolled to cylindrical form, with its edges 2 and 4 spaced from each other, is now ready for the edging or flanging operation. For this purpose, it is moved by flanges (not shown) on the feed fingers 10 to the edging station D.

At the edging station, the operations shown in Figs. 3, 4, 5, 6 and 7 are performed. Mechanism for the edging operations comprises a pair of vertically-reciprocating bars 19 and 20 and formers or edgers 21 and 22. The bars 19 and 20 reciprocate in a slot 23 in the horn 8 and are movable in synchronized relation to each other, so that as one bar is being raised, the other is being lowered. Each of the bars is provided with a recess 24 in its outer side, the upper end of which in one bar and the lower end of which in the other bar terminates in a shoulder or projection 25, the function of which will be presently described. At the opposite end of each recess is a wall 26, the function of which will also be described. The former 21 is provided with a beveled face 27 against which the flange which forms one portion of the can seam is bent, and the former 22 is provided with a beveled face 28 against which the flange which forms the other portion of the can seam is bent.

As the cylindrical can blank reaches a position adjacent the aforesaid bars and formers, the bar 19 is lowered, with the result that the shoulder 25 bends a portion of the blank adjacent the edge 4 outwardly, forming a flange 29. At the same time, the bar 20 is raised, with the result that the shoulder 25 on this bar bends a portion of the blank adjacent the edge 2 inwardly, forming a flange 30. The position of the bars 19 and 20 just prior to the aforesaid flanging operation is shown in Fig. 3, and the position thereof at the conclusion of such operations is shown in Fig. 5.

The bar 19 is then moved upwardly, causing the wall 26 of the recess 24 to bend the flange 29 outwardly and into engagement with the face 27 of the former 21, as indicated in dotted lines in Fig. 3 and in solid lines in Fig. 6. At the same time, the bar 20 is moved downwardly, causing the wall 26 of the recess 24 in this bar to bend the flange 30 outwardly and into engagement with the face 28 of the former 22, as indicated in dotted lines in Fig. 3 and in solid lines in Fig. 6. The appearance of the can body, at the conclusion of the aforesaid operations is shown in Fig. 7.

The feed fingers 10 then move the body along to the bumping station E, at which the various operations shown in Figs. 8, 9, 10, 11 and 11a are performed. At this station, the horn consists of relatively movable parts 8a and 8b, which are initially in the position shown in Fig. 8, that is to say, they are sufficiently close to each other as to leave spaces a and b between the horn parts and the blank 1. Disposed about the horn are semi-cylindrical flange interlocking members 31 and 32 which are pivoted together at their upper ends, as at 38, and are respectively movable about said pivot, and towards and away from the horn by means of levers 33 and 34 actuated in synchronism by suitable mechanism, not shown. The member 31 is provided at its lower end with a flange engaging tool 35, and the member 32 is provided with a similar tool 36.

Figure 8:
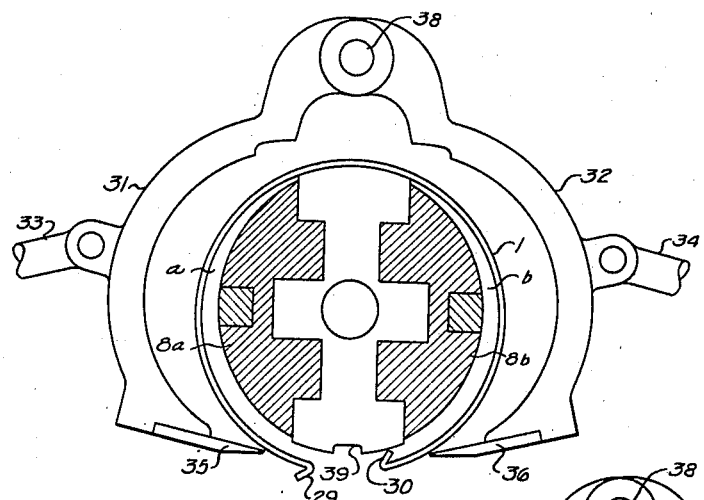
Fig. 8 is a section through the mechanism at the bumping station.
Figure 9:
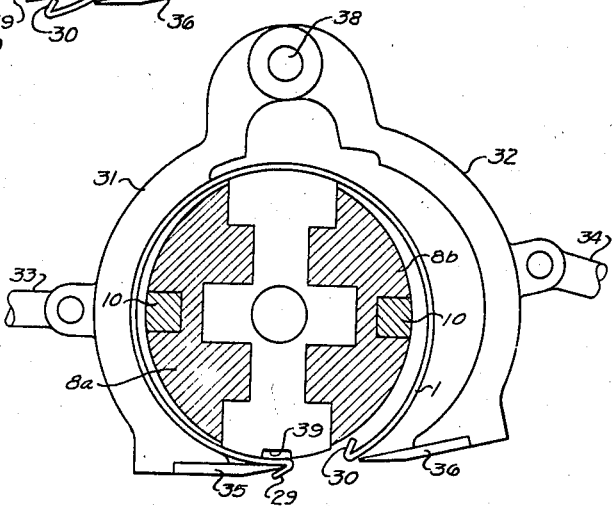
Figs. 9 and 10 show the positions of the respective parts of Fig. 8 during the locking operation.
Figure 10:
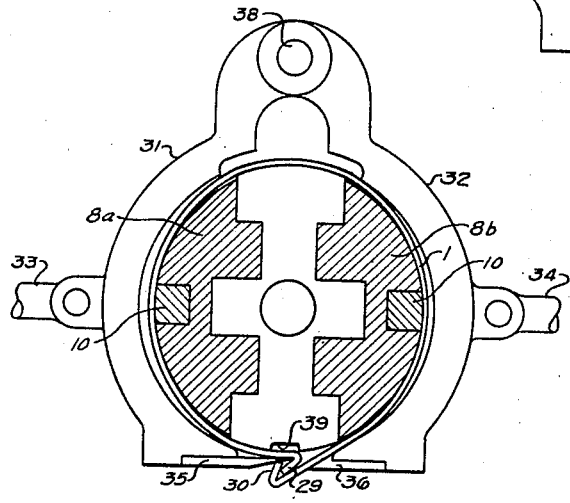

After the blank 1 reaches the position shown in Fig. 8, the member 31 is moved inwardly toward the horn to the position shown in Fig. 9, causing the tool 35 to engage the flange 29 of the can blank and moving the latter to the position shown in this figure. The member 32 is then moved inwardly toward the horn, causing the tool to move the flange 30 of the can blank to the position shown in Fig. 10, in which position it is interengaged with the flange 29.

The members 31 and 32 are then moved apart as shown in Fig. 11, and at the same time, the horn parts 8a and 8b are moved apart sufficiently to cause a full interlocking of the flanges 29 and 30 of the can blank.

However, the seam projects outwardly beyond the outer peripheral surface of the can body, and is required to be disposed inwardly of such surface.

The final operation which results in the movement of the seam inwardly of the peripheral surface of the can body is accomplished by a vertically reciprocable hammer 37, which, on its upward stroke, bumps the flanged edges of the blank, forming a lock seam of the character illustrated in Fig. 11, and forcing the seam inwardly of the peripheral surface of the can body, as shown in Fig. 11a, the central portion of the horn being relieved as at 39 for accommodating the body seam.

The body blanks coming from the notching station are fed to the horn in the rolling station at a high rate of speed in order to obtain the production desired. This means that the blank after being fed to the horn must be rapidly stopped and then shifted axially of the horn for further body forming operations. This abrupt change in the direction involves bringing the blank to rest and I have provided a modified form of horn 8', as shown in Fig. 12, to attain this object. In this form of horn a series of coils 40 are placed within circumferentially spaced recesses in the horn periphery. The can blank is made of sheet steel and hence is susceptible to the influence of the magnetic field thus set up. Hence when the forward motion of the blank of the horn is terminated the inertia is quickly overcome due to the above mentioned magnetic influence and results in stopping the blank in the desired position on the horn.

It is to be particularly noted that the sequence of operations is such that the rolling of the blank precedes, rather than follows, the edging operation, and that the means for rolling the blank and for causing an interengagement and interlocking of the flanges are, so far as I am aware, scope of the subjoined claims.

Referring again to Fig. 2, it will be noted that considerable speed is attained by the use of an endless belt to feed the blanks to the horn 8, and that the belt is also utilized to bend the blank as it leaves the lower beveled edge of the arbor so that the blank conforms with the surface of the horn. This dual function of the belt is believed to be entirely novel. It may also be noted that the seam is formed at the bottom, so that in the subsequent seam soldering operations, excess solder will not run over the can body.

It is to be understood that the form of my invention herewith shown and described, is to be taken as a preferred example of the same, and that various changes in the shape, size and arrangement of parts may be resorted to, without departing from the spirit of my invention, or the scope of the subjoined claims.

This application is a division of my copending application Serial No. 323,715, filed March 13, 1940, now Patent No. 2,309,963, issued Feb. 2, 1943.

Having thus described my invention, I claim:

1. A method of making can bodies from flat rectangular blanks comprising notching the blanks, bending the notched blanks to cylindrical form and rotating them about a forming axis extending concentrically through the formed blanks, and subjecting the rotating cylindrical blanks to the flux of a stationary magnetic field emanating from within the confines of the blanks to arrest the rotational movement of the blanks and to confine the blanks about the forming axis.

2. In an apparatus for making can bodies comprising means defining a notching station, a rolling station, an edging station, and a bumping station, a cylindrical horn in said rolling station and extending from there through the edging station to the bumping station, means for feeding the blanks peripherally around the horn, said horn having recesses in the peripheral surface thereof and blank magnetizing means disposed in said recesses for generating a magnetic flux along said magnetizing means to retard the peripheral movement of the blanks around the horn and to confine the blanks about the horn, and means for feeding the blanks along said horn from station to station.

FRANK KRUEGER.